Patented Mar. 6, 1951

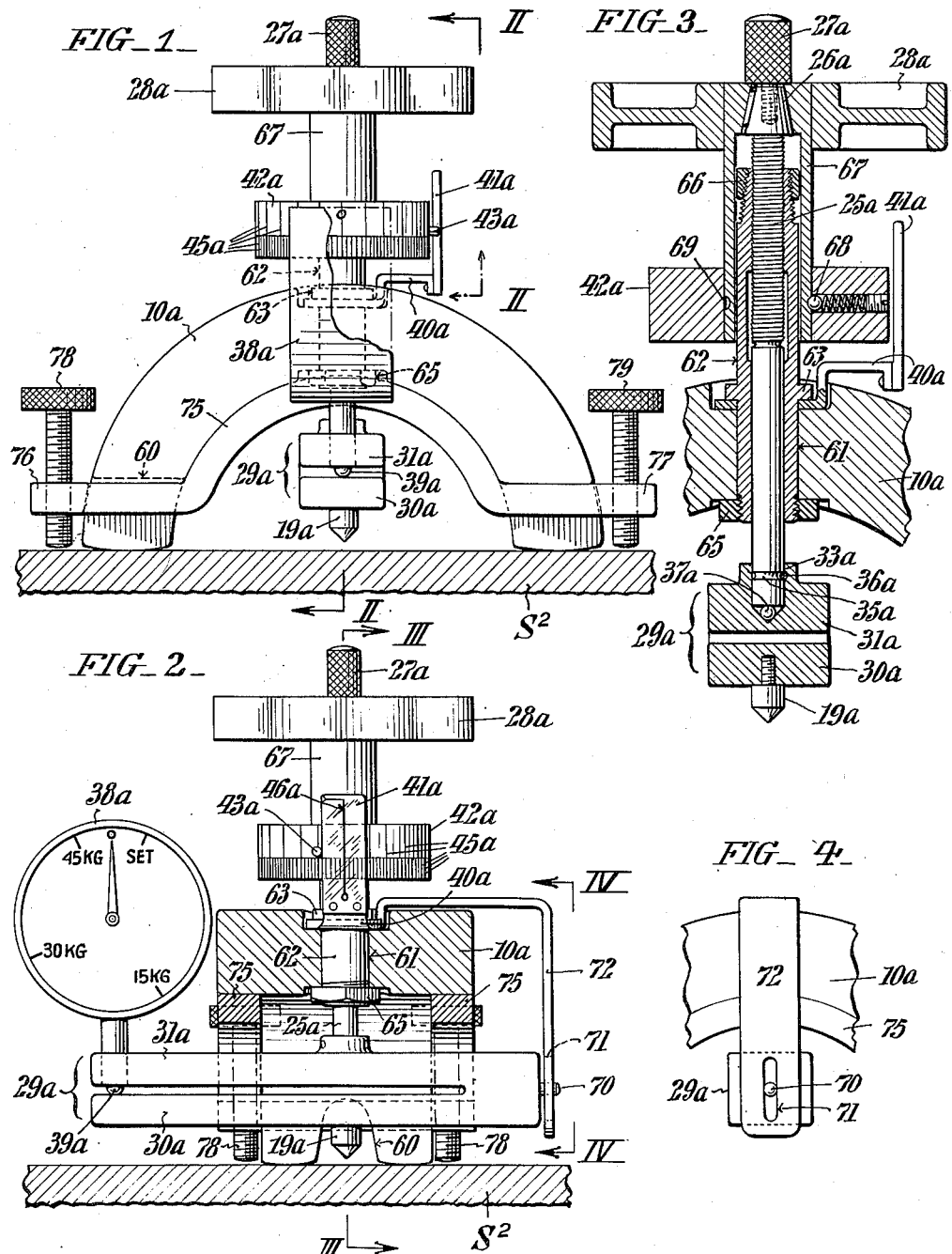

2,544,205

UNITED STATES PATENT OFFICE 2,544,205

HARDNESS TESTER

William A. Williams, Philadelphia, Pa., assignor to The American Pulley Company, Philadelphia, Pa., a corporation of Pennsylvania Application August 7, 1947, Serial No. 767,244

8 Claims. (Cl. 73—81)

This invention relates to devices useful in testing the hardness of metals and other materials. The chief aim of my invention is to provide a device of the kind referred to which is light and compact so that it may be easily carried about and directly applied to the specimens to be tested; which can be used to test the outer surfaces of solid specimens as well as the interior surfaces of hollow specimens; which is simple in construction and operation which can be relied upon for accuracy; and which moreover lends itself to ready production in quantity at relatively small cost.

Other objects and attendant advantages will appear from the following detailed description of the attached drawings, wherein Fig. 1 is a view in side elevation, of a hardness tester conveniently embodying my invention in one form and showing how the same is applied in testing.

Fig. 2 is a view partly in elevation and partly in section taken as indicated by the angled arrows II—II in Fig. 1.

Fig. 3 is a fragmentary view in section taken as indicated by the angled arrows III—III in Fig. 2; and Fig. 4 is a fragmentary view in elevation taken as indicated by the angled arrows IV—IV in Fig. 2.

As herein illustrated, my improved hardness tester comprises a holding element 10a in the form of a permanent horseshoe magnet whereof the pole ends are abutted against the surface of the specimen $S^2$ which is to be tested. The pole ends of the holding element 10a are rounded as shown and one of them is bifurcated as indicated at 60 in Fig. 2 so that the specimen is contacted at three points. By virtue of this construction, accurate tests may be made of specimens whereof the surfaces are undulated or uneven. The holding element 10a has a central transverse bore 61 into which is fitted a tube 62 of non-magnetic metal such as brass or bronze, said tube having a circumferential stop flange 63 between which and the bottom of the counter bore in the top of said holding element, the anchorage end of a bracket 40a is interposed. The lower end of the tube 62 is externally threaded for engagement by a nut 65, and the upper end tapered and split and likewise externally threaded for engagement by a nut 66. As shown, the tube 62 is internally threaded at its upper end to serve as a bearing centrally over the gap in the magnet 10a for a screw adjusting element 25a. Affixed to the free end of the arm 30a of the spring element 29a is a load gauge 38a of a conventional type whereof the actuating plunger 39a contacts the end of arm 31a of said spring element. The dial of the gauge 38a is graduated to indicate loads in kilograms, and shown in Fig. 2 has special markings designated "Set," "15 KG," "30 KG," and "45 KG," in addition to a zero mark, for a purpose also later on explained. The lower end of the adjusting element 25a is plain cylindric and extends into the socket 33a in the upper arm 31a of a horizontally arranged spring element 29a of hair pin configuration, it being held in said socket by a key 36a which passes into a circumferential groove 35a thereof. A ball 37a is interposed between the lower end of the adjusting element 25a and the bottom of the socket 33a in the arm 31a of the spring element 29a to reduce friction and ease operation. To the extreme tapered upper end of the adjusting element 25a is secured, by means of screw 27a, a manipulating hand wheel 28a having a pendent axial sleeve extension 67 which, with interposition of an annular clearance, surrounds the upper projecting portion of the tube 62. Mounted on the lower end of the sleeve extension 67 of hand wheel 28a is a collar 42a with peripheral graduations 45a for coordination with a marker 46a on a transparent upward projection 41a on bracket 40a. A stud 43a on collar 42a is arranged to cooperate with the projection 41a to restrict rotation of the adjusting element 25a to a single turn. The collar 42a is held in position by a spring-pressed ball 68 which fits into a circumferential groove 69 in the sleeve extension 67 of hand wheel 28a. A penetrating element 19a is screwed into the lower arm 30a of spring element 29a, with the actuating plunger 39a bearing upon the other arm 31a of said spring element. Rotation of the spring element 29a within the bight of the magnet 10a is prevented through engagement of a stud 70 thereon in a slot 71 in the down-turned end of a stop arm 72 integrally formed on the bracket 40a as shown in Figs. 2 and 4.

In order to facilitate dislodgment of the tester after a test has been completed, I have provided means including straps 75 of non-magnetic material which conform to and are suitably secured to the arcuate inner surface of magnet 10a, and which have lateral projections 76 and 77 in a plane above the pole faces as shown in Figs. 6 and 7. Threadedly engaged in the projections 76 and 77 are thumb screws 78 and 79 capable, in being turned, of reacting with the surface of the specimen to overcome the drawing power of the magnet, whereupon the tester can be readily withdrawn. Normally, of course, the screws 78 and 79 are backed off to the point beyond the plane of the pole ends of magnet 10a as shown in Fig. 1 so that said pole ends can bear directly upon the surface of the specimen S². While in Figs. 1 and 3 I have shown the holding element 10a as having the form of a permanent horseshoe magnet, it will be obvious that an electromagnet may be substituted therefor without change in the operation of functioning of the other elements of the tester. When an electromagnet is used, the dislodgment means above described can of course be dispensed with, since upon interruption of current flow to the coil or coils of such a magnet, the residual flux will be insufficient in power to prevent ready removal of the tester from the specimen after a test has been made.

In the use of the tester, the hand weel 28a is turned to bring the point 19a into contact with the specimen 52 and until the pointer of gauge 38a registers "Set," whereupon the collar 42a is rotatively shifted on sleeve 61, so that its zero graduation coincides with the marker 46a. Thereupon the hand weel 28a is further turned until the gauge pointer registers successively at 15 KG, 30 KG and 45 KG with interruptions at each stage for ascertainment of the corresponding depth penetration readings on scale 45a.

Having thus described my invention, I claim:

1. In a hardness tester for testing the hardness of magnetizable metals, a holding element in the form of a magnet with spaced co-planar pole faces capable of temporary attachment to a surface of the specimen to be tested; an element for penetrating the surface of the specimen; a regulatable adjusting element engaged in the holding element medially between the pole ends; a spring element interposed between and connecting the penetrating element and the adjusting element; a load indicating guage actuated through flexure of the spring element as the adjusting element is regulated; and a depth penetration indicating means operated through movement of said adjusting element.

2. A hardness tester according to claim 1, further including means on the holding element at its pole ends operable by reaction upon the specimen to assist in dislodging the tester after a test is completed.

3. A hardness tester according to claim 1, further including thumb screws on the holding element adjacent its pole ends capable of reacting upon the specimen to assist in dislodging the tester after a test is completed.

4. A hardness tester according to claim 1, wherein the adjusting element is in the form of a screw threadedly engaged passing radially through the arch of the magnet at the center and provided with a manipulating hand wheel; and wherein the depth penetration indicating means comprises a marker fixed in relation to the magnet for coordination with graduations circumferentially of the adjusting element.

5. A hardness tester according to claim 1, wherein the adjusting element is in the form of a screw threadedly engaged in and passing down through a non-magnetic bushing secured in a radial bore through the arch of the magnet at the center, said bushing being prolonged upward beyond the top of the magnet and said screw having, at its upper end, a manipulating hand wheel with a tubular hub extending down over the projecting portion of the bushing; and wherein the depth penetration indicating means includes a marker which is fixedly secured to the bushing, and a collar on the tubular portion of the wheel hub with graduations on its periphery for coordination with the marker.

6. A hardness tester according to claim 1, wherein the adjusting element is in the form of a screw threadedly engaged in and passing down through a non-magnetic bushing secured in a radial bore through the arch of the magnet at the center, said bushing being prolonged upward beyond the top of the magnet and said screw having, at its upper end, a manipulating hand wheel with a tubular hub extending down over the projecting portion of the bushing; and wherein the depth penetration indicating means includes a marker which is fixedly secured to the bushing, and a collar held in place through engagement of a spring-biased ball internally thereof with a circumferential groove in the tubular portion of the wheel hub, and having circumferential graduations for coordination with the marker.

7. In a hardness tester for testing the hardness of magnetizable metals, a holding element in the form of a magnet adapted to attach itself to the surface of the metallic specimen to be tested; a point element for penetrating the surface of the specimen; a regulatable adjusting screw element rotative in a bearing centrally over a gap in the magnet; an interposed spring element connecting the penetrating element with the adjusting element; a load indicating guage actuated through flexure of the spring element as the adjusting element is regulated; and a depth penetration indicating means operated through movement of the adjusting element.

8. A hardness tester according to claim 7, further including means on the holding element operable by reaction upon the specimen, to assist in dislodging the tester after a test is completed.

WILLIAM A. WILLIAMS.

REFERENCES CITED

The following references are of record in the file of this patent:

UNITED STATES PATENTS

| Number | Name | Date |
|---|---|---|
| 710,257 | De Leeuw | Sept. 30, 1902 |
| 983,083 | Pealing | Jan. 31, 1911 |
| 1,255,913 | Morse | Feb. 12, 1918 |
| 1,722,036 | Byl | July 23, 1929 |
| 1,982,026 | Shore | Nov. 27, 1934 |
| 2,329,827 | Clark | Sept. 21, 1943 |

FOREIGN PATENTS

| Number | Country | Date |
|---|---|---|
| 445,345 | Germany | June 3, 1927 |
| 542,720 | Germany | Jan. 27, 1932 |